(No Model.)
C. H. ROTH.
PNEUMATIC TIRE.
No. 481,197. Patented Aug. 23, 1892.
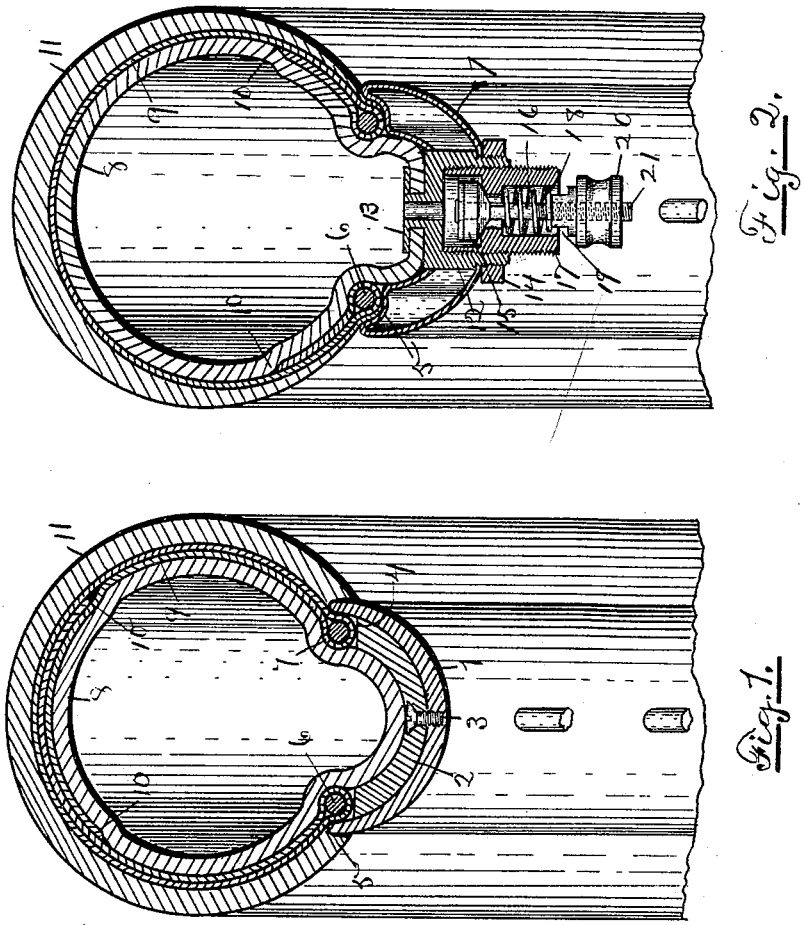
WITNESSES:
Richard Ittig
Edward Schwoerer
INVENTOR
Charles H. Roth,
By E. P. Robbins, M.E.,
ATTORNEY

UNITED STATES PATENT OFFICE.

CHARLES H. ROTH, OF CINCINNATI, OHIO.

PNEUMATIC TIRE.

SPECIFICATION forming part of Letters Patent No. 481,197, dated August 23, 1892.

Application filed November 14, 1891. Serial No. 411,869. (No model.)

*To all whom it may concern:*

Be it known that I, CHARLES H. ROTH, a citizen of the United States, residing at Cincinnati, in the county of Hamilton and State of Ohio, have invented certain new and useful Improvements in Wheel-Tires; and I do hereby declare the following to be a full, clear, and exact description of the invention, such as will enable others skilled in the art to which it appertains to make and use the same.

My invention relates to improvements in bicycle and similar wheel-tires.

The object of my invention is to produce a wheel-tire of simple and inexpensive construction and convenient to place and remove.

The invention consists in a wheel-tire made of tubing and wire ring-supports for the tubes and in the manner of construction set forth; also, in the construction of a tire-valve.

Figure 1 shows one modification, and Fig. 2 another modification, and shows, also, a tire-valve combined therewith.

The same numbers refer to the same parts in different figures.

1 is the rim of a wheel; 2, a ring of stiff material, as leather, placed in the hollow portion of the rim for the purpose of furnishing shoulders 4 adjacent the edges 5 of the rim, against which the edges of the tube 9 are intended to rest. The rings 2 are secured to the rim 1 by means of screws 3.

The tire proper consists of the parts 8 9 11. 8 is a rubber air-tube, and 9 a protecting-cover made of suitable textile material, as duck. It is made with wire rings 6, secured at its edges.

6 are continuous rings of wire. The rings are made of wire bent into shape, and then their ends are united by soldering or welding. The material which forms the tube 9 is doubled around the wire rings 6 in two different manners.

In Fig. 1 the material is doubled around the wires in such a manner as to form folds embracing the wire rings and to present a continuous and an even exterior surface to the contiguous rubber tire-tube 11. The edges of the strip are then lapped over each other within the continuous portion, as shown in Fig. 1. The edges 10 may be sewed to the body part of the tube 9 and the intervening part cemented to the body part. A seam may also be made adjacent the wires 6 to secure them in place. The tube 9 may have its two parts connected together throughout in a manner to make the tube integral. It is preferable in any case to sew the two parts together adjacent the wire rings to prevent their displacement.

In Fig. 2 the tube 9 is made of a single piece and has its edges lapped around the wire 6 and secured in the same manner as in the first modification. The first modification affords greater strength, while the other affords less expense. The wires 6 are used to give support to the flexible tube 9 and also to form rigid means for securing the tube permanently in position.

In Fig. 1 the wire rings rest upon the edges of the ring 2 and against the inner sides of the rim 1. In Fig. 2 the wire rings 6 rest in depressions formed in the edges 5 of the rim and no piece 2 is used. Since the piece 2 is secured to the rim 1 by screws 3, it forms a part of the rim, so that the two modifications forming ledges or shoulders for the wire rings 6 are equivalents.

In Fig. 1 the tire-tube 11 is made of rubber and has its edges retained in position by resting on the edges 5 of the rim 1, while in Fig. 1 the tire-tube 11 has its edges made thin and secured within the depressions in the rim edges between the wire rings 6 and the outer edges of the rim.

In placing such a tire on a wheel one side is put in place first and then the other. One wire ring is forced into the hollow portion of the rim or of the part 2 and then placed on the shoulder 4, the air-tube 8 not being inflated and having been previously placed in the tube 9. After one side of the tube 9 is in place the air-tube 8 is pressed into the hollow portion of the rim and the valve put in place, and then the air-tube is inflated sufficiently to give the tubes 8 and 9 an extended condition, conducing to ease of manipulation. Then the other side of the tube 9 is put in position by commencing at any point along the rim and forcing the wire ring 6 inward until it rests on its proper shoulder 4. That operation is continued around the rim until the entire tube is in place. Then the air-tube 8 is completely inflated and the operation then completed. The valve consists of a chamber 12, having a flange 13 and an intervening neck, by which it is attached to the air-tube 8 by having its flange 13 passed through a hole in the air-tube. A hole is made through the rim 1 to permit the passage of the chamber 12, and the latter is secured to the rim by means of a shoulder on the inside of the rim and a nut 14 on the outside screwed onto the end of the chamber. A part 17 is screwed into the outer end of the chamber 12, the end of which forms a valve-seat and its body a spring-case. The spring 18 is compressed between the contraction forming the valve-seat and a nut 20 on the valve-stem 16. The sides of the nut are cut away at 19 to permit the air to enter the spring-chamber and thence the valve-chamber. When in use and the air-tube 8 is inflated, the nut 20 is run upon the stem 16 and made to clamp the valve tight on its seat, and thus prevent leakage of air from the tube 8 by vibration of the valve on account of jars in running.

I claim—

1. The combination of a wheel-tire inflated with air and a valve consisting of a chamber secured to a wheel-tire in a suitable manner, a valve, a stem, a spring, and a nut on the stem capable of clamping the valve permanently in place, substantially as set forth.

2. The combination of a wheel-tire inflated with air, a valve consisting of a chamber secured to the rim by a shoulder on the chamber within the rim and a nut exterior to the rim, a spring-case screwed to the chamber, having a valve-seat on its inner end, a valve, a stem, and a nut on the stem capable of drawing the valve against its seat, substantially as set forth.

3. The combination of a wheel-tire inflated with air, a valve consisting of a chamber secured to the rim by a shoulder on the chamber within the rim and a nut exterior to the rim, a spring-case screwed to the chamber, having a valve-seat on its inner end, a valve, a stem, a spring, and a nut on the stem cut away at its sides for the passage of air and capable of drawing the valve against its seat, substantially as set forth.

4. The combination of a wheel-tire inflated with air, a valve consisting of a chamber secured to the rim by a shoulder on the chamber within the rim and a nut exterior to the rim, a spring-case screwed to the chamber, having a valve-seat on its inner end, a valve, a stem, and a nut on the stem arranged to clamp the valve to its seat permanently and securely, substantially as set forth.

In testimony whereof I now affix my signature in presence of two witnesses.

CHARLES H. ROTH.

Witnesses:
EDWARD P. ROBBINS,
GUSTAV A. ROTH.